United States Patent

Kaneko et al.

[11] Patent Number: 6,002,458
[45] Date of Patent: *Dec. 14, 1999

[54] LIQUID CRYSTAL DISPLAY DEVICE

[75] Inventors: Takeo Kaneko; Osamu Yokoyama; Satoshi Nebashi; Tatsuya Shimoda, all of Suwa, Japan

[73] Assignee: Seiko Epson Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/847,977

[22] Filed: Apr. 24, 1997

[30] Foreign Application Priority Data

Jul. 11, 1996 [JP] Japan ................................ 8-201143

[51] Int. Cl.⁶ ............................................. G02F 1/1335
[52] U.S. Cl. ........................................ 349/61; 349/5
[58] Field of Search .................................. 349/61, 68, 5, 349/70, 71

[56] References Cited

U.S. PATENT DOCUMENTS

| 4,799,050 | 1/1989 | Prince et al. ........................ 340/765 |
| 5,132,839 | 7/1992 | Travis . |
| 5,359,345 | 10/1994 | Hunter ................................ 345/102 |
| 5,504,597 | 4/1996 | Sprague et al. ........................ 359/40 |
| 5,666,226 | 9/1997 | Ezra et al. .............................. 359/621 |

FOREIGN PATENT DOCUMENTS

| 62-036640 | 2/1987 | Japan . |
| A-62-0336640 | 2/1987 | Japan . |
| A-01-158417 | 8/1989 | Japan . |
| 1-158417 | 9/1989 | Japan . |
| 4-263244 | 9/1992 | Japan . |
| 6-283818 | 10/1994 | Japan . |
| A-08-211361 | 8/1996 | Japan . |
| 8-211361 | 12/1996 | Japan . |
| 94 06249 | 3/1994 | WIPO . |
| WO 94 06249 | 3/1994 | WIPO . |

*Primary Examiner*—James A. Dudek
*Attorney, Agent, or Firm*—Oliff & Berridge, PLC

[57] ABSTRACT

A liquid crystal display device has a light source and includes a two-dimensional light-emitting element array plate formed of a plurality of light-emitting elements arranged in a plane array, and a liquid crystal panel having a plurality of pixels. Each of the pixels corresponds to each of the light-emitting elements. A light-projecting portion of each of the light-emitting elements is disposed within a light-transmitting region of the corresponding pixel.

13 Claims, 6 Drawing Sheets

$h\nu_R < h\nu_G < h\nu_B$ $E_{gR} < E_{gG} < E_{gB}$

LIQUID CRYSTAL DISPLAY DEVICE

BACKGROUND OF THE INVENTION

1. Field of the Invention

The invention relates to a directly-visible transmissive type or projector type of liquid crystal display device.

2. Description of Related Art

A directly-visible transmissive type or projector type of liquid crystal display device is provided with a halogen lamp or the like as a light source. A lamp of this type is inferior from the utilization efficiency point of view, in that it generates a large amount of heat and it also emits a great deal of light outside the visible range. This utilization efficiency is degraded even further if the light is passed through a color filter to form a color display.

An image display device that uses laser beams of three colors (red, green, and blue) as a light source is disclosed in Japanese Patent Laying-Open No. 4-263244. Since a laser beam is colored light of a specific wavelength, the utilization efficiency is higher than that of a prior-art lamp.

However, the efficiency with which the light is utilized is also affected by the aperture ratio of the liquid crystal panel. In other words, not all of the light from the light source passes through the liquid crystal panel; some of it is blocked by dead areas such as the black matrix, signal lines, and transistors. To improve the ratio of light that passes through, it is necessary to reduce the size of dead areas, or increase the aperture ratio. However, since it is impossible to remove such dead areas, there is a limit to improvements in aperture ratio.

SUMMARY OF THE INVENTION

The invention was devised to solve the above described technical problems. An objective thereof is to provide a liquid crystal display device in which the ratio of light that passes therethrough is increased, thus increasing the efficiency with which the light is utilized.

The liquid crystal display device of the invention has a light source and comprises a two-dimensional light-emitting element array plate formed of a plurality of light-emitting elements arranged in a plane array, and a liquid crystal panel having a plurality of pixels. Each of the pixels corresponds to each of the light-emitting elements. A light-projecting portion of each of the light-emitting elements is disposed within a light-transmitting region of the corresponding pixel.

In this aspect of the invention, a light-projecting portion that acts as a point light source is disposed within a light-transmitting region of the corresponding pixel, so that virtually no light is blocked, in comparison with a prior-art plane light source.

The light-emitting element could be a light-emitting diode, a semiconductor laser, or the like. Each of these components generates less heat than a prior-art halogen lamp or the like, and can also be limited to a specific wavelength, so that the utilization efficiency thereof is higher.

In particular, if a semiconductor laser is used as each light-emitting element, the polarization plane of the emitted light is aligned, making it possible to omit the conventional polarizer from the side of the liquid crystal panel on which light is incident.

The liquid crystal display device preferably comprises at least three pairs of the two-dimensional light-emitting element array plates and the liquid crystal panels. It is also preferable that an optical system combines light from all of the two-dimensional light-emitting element array plates. Light of different wavelengths is emitted from each of the two-dimensional light-emitting element array plates.

With the invention, at least three pairs of two-dimensional light-emitting element array plates and liquid crystal panels are used, and the light therefrom is combined to create a color display.

With the invention, it is preferable that each of the light-emitting elements is a semiconductor light-emitting element comprising at least three layers of light-emitting portions and four layers of reflective mirrors disposed in the depthwise direction. The first, second, and third light-emitting portions emit light of first, second, and third different wavelengths respectively that satisfy the relationships: first wavelength<second wavelength<third wavelength. The first reflective mirror, the first light-emitting portion, the second reflective mirror, the second light-emitting portion, the third reflective mirror, the third light-emitting portion, and the fourth reflective mirror form a multi-layer structure, in that sequence. The first reflective mirror has a reflectivity that is less than that of the fourth reflective mirror, to form the light-projecting portion. The second reflective mirror reflects light of the first wavelength but passes light of the second and third wavelengths. The third reflective mirror reflects light of the second wavelength but passes light of the third wavelength. The fourth reflective mirror reflects light of the third wavelength.

With this aspect of the invention, the first light-emitting portion is disposed between the first and second reflective mirrors. In this case, the second reflective mirror reflects light of the first wavelength, so that the light of the first wavelength oscillates between the first and second reflective mirrors and is thus amplified.

In a similar manner, the second light-emitting portion is disposed between the first and third reflective mirrors. In this case, the second reflective mirror passes light of the second wavelength and the third reflective mirror reflects light of the second wavelength. Therefore, light of the second wavelength oscillates between the first and third reflective mirrors and is thus amplified.

Furthermore, the third light-emitting portion is disposed between the first and fourth reflective mirrors. In this case, the second and third reflective mirrors pass light of the third wavelength and the fourth reflective mirror reflects light of the third wavelength. Therefore, light of the third wavelength oscillates between the first and fourth reflective mirrors and is thus amplified.

In this manner, each of three layers of light-emitting portions is interposed between a pair of reflective mirrors. Light of different wavelengths from each of the light-emitting portions can thus be emitted from a single light-projecting portion.

In addition, the following relationship are satisfied: first wavelength<second wavelength<third wavelength. The reason therefor is discussed below. Light of a short wavelength has a high energy level, whereas light of a long wavelength has a low energy level. The energy gap defined when a semiconductor emits light of a short wavelength is wider than that defined when a semiconductor emits light of a long wavelength. In addition, if the optical energy is greater than the energy gap of the semiconductor, a phenomenon in which the light is absorbed by the semiconductor occurs.

With this aspect of the invention, the first, second, and third light-emitting portions are arranged as layers in that sequence, in such a manner that the wavelength of the light emitted thereby increases sequentially as the energy gap decreases. Therefore, when light of the second wavelength passes through the first light-emitting portion, the optical energy thereof is less than the energy gap of the first light-emitting portion and thus the light is not absorbed. Similarly, when light of the third wavelength passes through the first and second light-emitting portions, the optical energy thereof is less than the energy gaps of the first and second light-emitting portions and thus the light is not absorbed.

Thus, Light from a plurality of light-emitting portions formed in the depthwise direction can all be emitted in the same direction.

This aspect of the invention makes it possible for a single pixel to display a plurality of colors. Thus the resolution of display can be greatly increased, in comparison with a liquid crystal display device in which a plurality of colors is obtained by combining a plurality of dots.

With the invention, it is also preferred that light of the first, second, and third wavelengths is emitted in a sequence at a predetermined period; the liquid crystal panel is driven in synchronization with that period; and a plurality of colors can be displayed by utilizing the after-image effect of the human eyes in response to the time ratio of light of each wavelength passing through the liquid crystal panel during a unit time.

With this aspect of the invention, the liquid crystal panel is driven in synchronization with the period at which the light of the first, second, and third wavelengths is switched. Thus light of only a desired wavelength, or rather, color, can be made to pass through the panel. In this case, if the continuous switching of colors is too fast, human eyes are unable to spot the changes, and thus the after-image effect can be used to give the appearance of mixed colors. The color display can be obtained in response to the time ratio of the light passing through the panel.

With the invention, it is preferable that the light-emitting element is a surface-emitting type of semiconductor laser; and at least one of a pair of cladding layers sandwiching an active layer is formed to have a columnar shape with one direction of a cross-sectional surface thereof being shorter.

In accordance with the invention, the laser beams can be emitted with the polarization planes thereof aligned in the shorter direction of the cross-sectional surface of the cladding layer. Further details are disclosed in Japanese Patent Laying-Open No. 6-283818. With this semiconductor laser, it is simple to set the polarization plane of the laser beam beforehand, so that preferred light can be emitted to pass through the liquid crystal panel.

The invention is preferably applied to a projection type of display device having a lens and screen. The display device could be a front projection display in which the image is projected onto the front surface of the screen, or a rear projection display in which the image is projected onto the rear surface of the screen.

BRIEF DESCRIPTION OF THE DRAWINGS

The invention is described in detail with reference to the following drawings, wherein.

DETAILED DESCRIPTION OF THE PREFERRED EMBODIMENTS

First Embodiment

Figure 2:
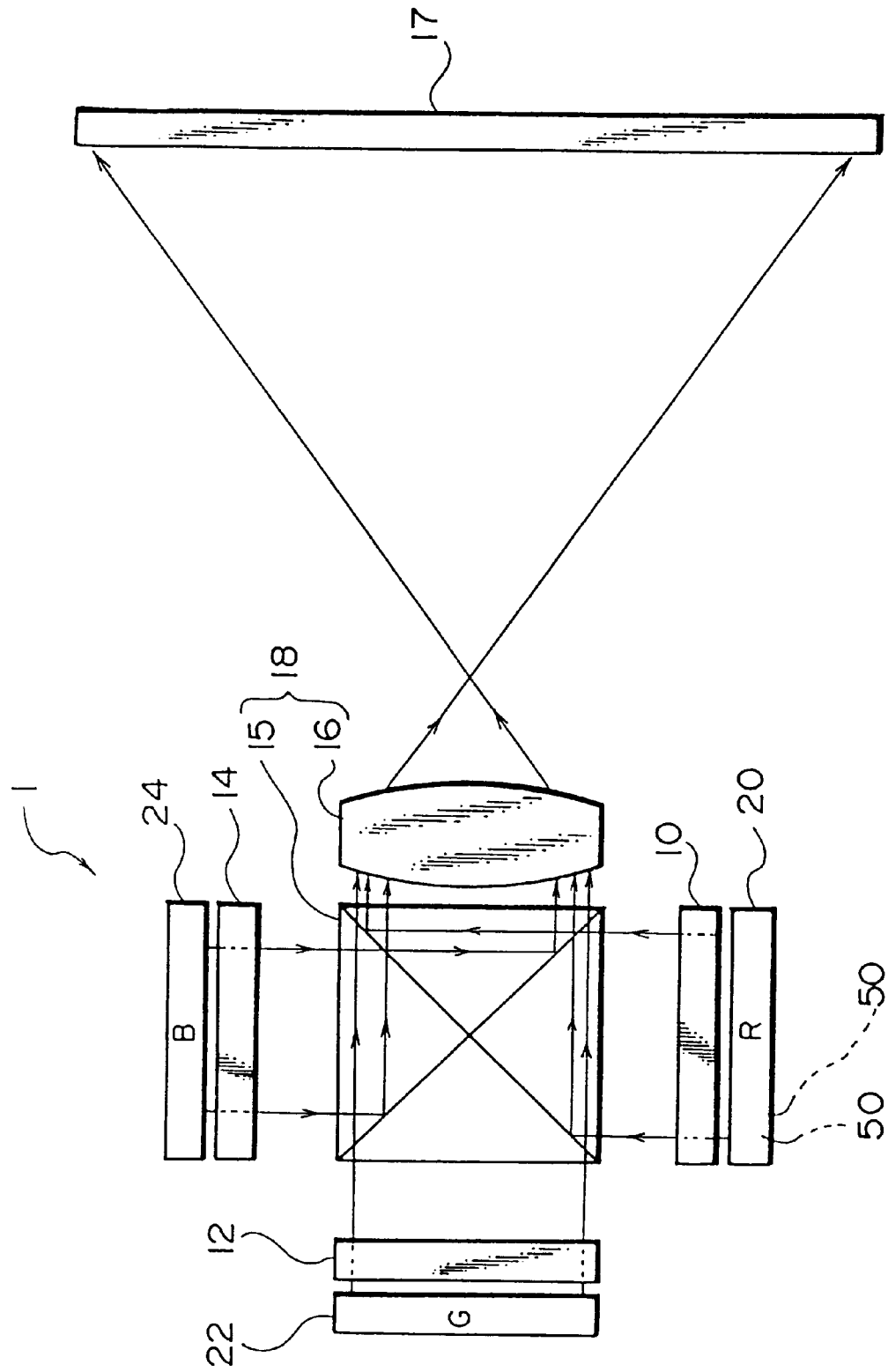
FIG. 2 is a schematic view of a liquid crystal display device in accordance with a first embodiment of the invention.

Preferred embodiments of this invention will now be described with reference to the accompanying figures. A schematic view of a liquid crystal display device 1 in accordance with a first embodiment is shown in FIG. 2. This liquid crystal display device 1 is a projection type of display having three liquid crystal panels 10, 12, and 14 and three light-emitting element array plates 20, 22, and 24.

The arrangement is such that red (R), green (G), and blue (B) light is emitted from the light-emitting element array plates 20, 22, and 24, respectively. Light that has been adjusted by each of the liquid crystal panels 10, 12, and 14 is combined by a dichroic prism 15, is expanded by a lens 16, then is projected onto a screen 17.

In this case, an optical system 18 comprising the dichroic prism 15 and the lens 16 is configured in a known manner, so further description thereof is omitted. If the liquid crystal display device 1 is viewed from the front surface of the screen 17, it is a front projection display device; if light passes through the screen 17 and is viewed from the rear surface thereof, it is a rear projection display device.

Figure 1:
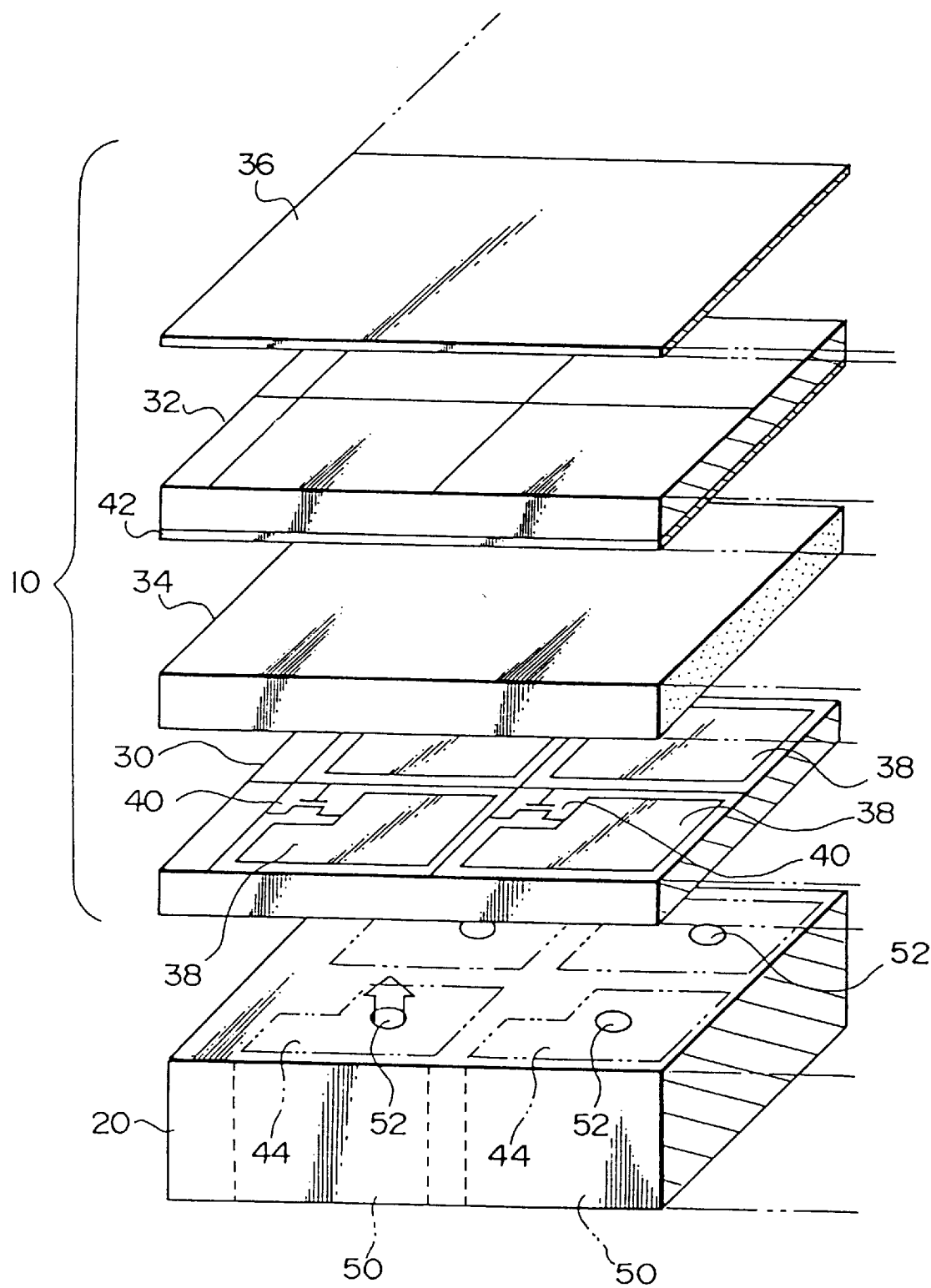
FIG. 1 is an exploded perspective view of a liquid crystal panel and light-emitting element array plate.

An exploded perspective view of the liquid crystal panel 10 and light-emitting element array plate 20 is shown in FIG. 1. Note that the configurations of the liquid crystal panels 12 and 14 and light-emitting element array plates 22 and 24 of FIG. 2 are the same.

In FIG. 1, the liquid crystal panel 10 is configured of a liquid crystal 34 inserted between a TFT substrate 30 and an opposing substrate 32, with a polarizer 36 affixed to the outer surface of the opposing substrate 32. The TFT substrate 30 is provided with a transparent pixel electrode 38 and a transistor 40 that acts as a switch for controlling the application of a voltage to the pixel electrode 38. A common electrode 42 is provided on the opposing substrate 32. The liquid crystal 34 is driven by a potential difference between the pixel electrode 38 and the common electrode 42. The opposing substrate 32 is colorless and does not have a color filter.

Note that the polarizer 36 is provided on only the outer surface of the liquid crystal panel 10; there is no polarizer on the side of the light-emitting element array plate 20. This is because the light emitted from the light-emitting element array plate 20 is a laser beam, so that the polarization plane of the light is already orientated.

Figure 3A:
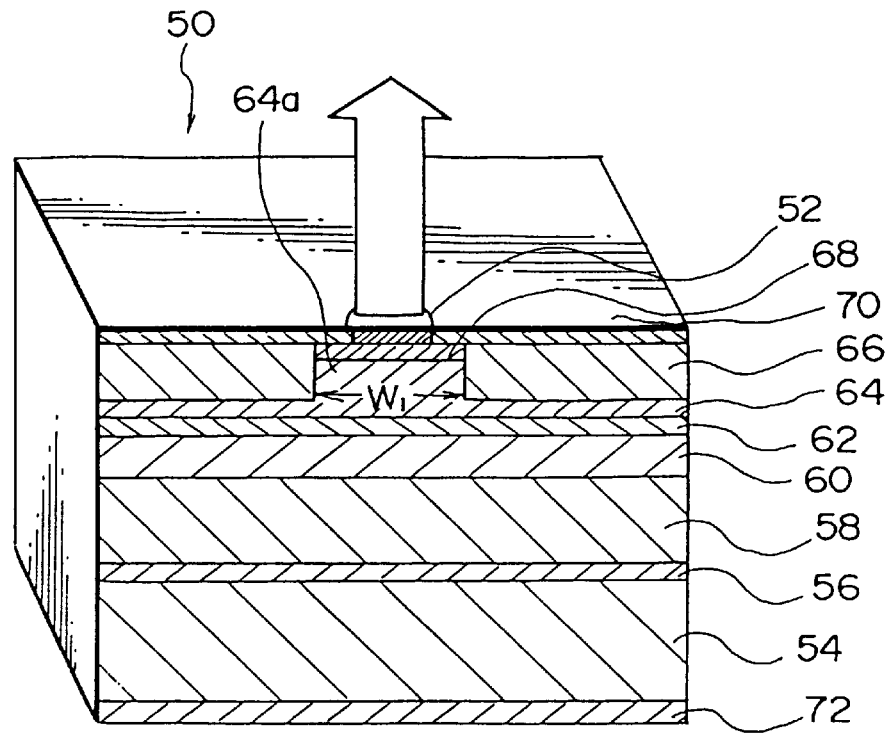
FIG. 3A is a perspective cross-sectional view of a semiconductor laser and FIG. 3B is a plan view thereof.
Figure 3B:
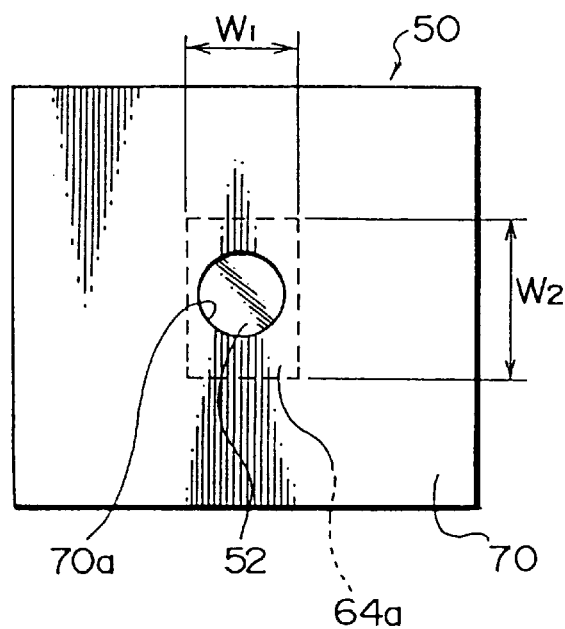

The light-emitting element array plate 20 comprises a plurality of semiconductor lasers 50 arranged in a flat plane. A perspective cross-sectional view of one of these semiconductor lasers 50 is shown in FIG. 3A and a plan view thereof is shown in FIG. 3B. More specifically, the device is provided with the same number of semiconductor lasers 50 as pixel electrodes 38 in FIG. 1. For example, the device has 640×480 of pixel electrodes 38 and the same number of semiconductor lasers 50.

A reflective mirror 52 that forms a light-projecting portion of each semiconductor laser 50 is disposed within a region 44 that faces the pixel electrode 38 which acts as a light-transmitting region, as shown in FIG. 1.

In this case, each side of the pixel electrode 38 is about 20 μm and the diameter of the reflective mirror 52 is about 0.5 to several μm. Each side of the semiconductor laser 50 is about 1 to 10 and some μm.

Since the reflective mirror 52 is disposed within the region 44 facing the pixel electrode 38 in this manner, the laser beam emitted from the reflective mirror 52 is not blocked by the transistor 40. There is thus no blocking of the laser beam, and the efficiency with which the light is utilized is therefore greatly improved. This semiconductor laser 50 is efficient in that the amount of heat generated thereby is small and the wavelength of the light it produces is consistent.

The polarization plane of the light from the semiconductor laser 50 is also aligned in the direction specified by the design. This configuration is described in detail in Japanese Patent Laying-Open No. No. 6-283818, so further description is omitted herein.

As shown in FIG. 3A, a reflective mirror 58 is provided on a substrate 54 of the semiconductor laser 50, with a buffer layer 56 therebetween. A cladding layer 60, an active layer 62, and another cladding layer 64 are provided on the reflective mirror 58.

A III-V group compound semiconductor such as AlGaInP or AlGaAs is used as the material of the active layer 62 for red (R) laser light, and a compound semiconductor such as InGaN, GaN, SiC, or ZnSe is used for green (G) or blue (B) laser light.

The cladding layer 64 has a columnar portion 64a. A section through the columnar portion 64a has a short side of W1 and a long side of W2, as shown in FIG. 3B. An electrically conductive contact layer 68 is formed on the columnar portion 64a. The columnar portion 64a and the contact layer 68 are surrounded by an embedding layer 66.

An electrode layer 70 is formed on top of the embedding layer 66 and the contact layer 68. This electrode layer 70 is provided with a small aperture 70a. The small aperture 70a is positioned over the contact layer 68, but it is formed to be smaller than the contact layer 68. The electrode layer 70 is therefore connected electrically to the contact layer 68, even though the small aperture 70a is formed therein. The reflective mirror 52 is formed within the small aperture 70a. Another electrode layer 72 is formed on the opposite side of the substrate 54 from the buffer layer 56. The electrode layers 70 and 72 apply a voltage for shaping an population inversion of carriers in the semiconductor.

With this semiconductor laser 50, the polarization plane of the laser beam is parallel to the short side W1 of the cross-sectional surface of the columnar portion 64a. Therefore, if each short side W1 of all the semiconductor lasers 50 of the light-emitting element array plate 20 is orientated in the same direction, the polarization plane of all of the laser light produced thereby is aligned. This makes it possible to omit the conventional polarizer on the side of the light-emitting element array plate 20 in the liquid crystal display device 1 of this embodiment. Since a polarizer does not align the polarization planes, the efficiency with which the laser beam is utilized is increased.

It should be noted that the cross-sectional surface of this columnar portion 64a is not limited to a rectangular shape; it can equally well be an oval shape. In such a case, the polarization plane of the laser beam is aligned parallel to the short diameter.

A light-emitting diode could be used instead of each of the above described semiconductor lasers 50. It should be noted that a resonant cavity provided with mirror layers such as distributed Bragg reflectors is preferable. In such a case, it is possible to obtain a narrow radiation angle and high ratio of light emission.

Second Embodiment

Figure 4:
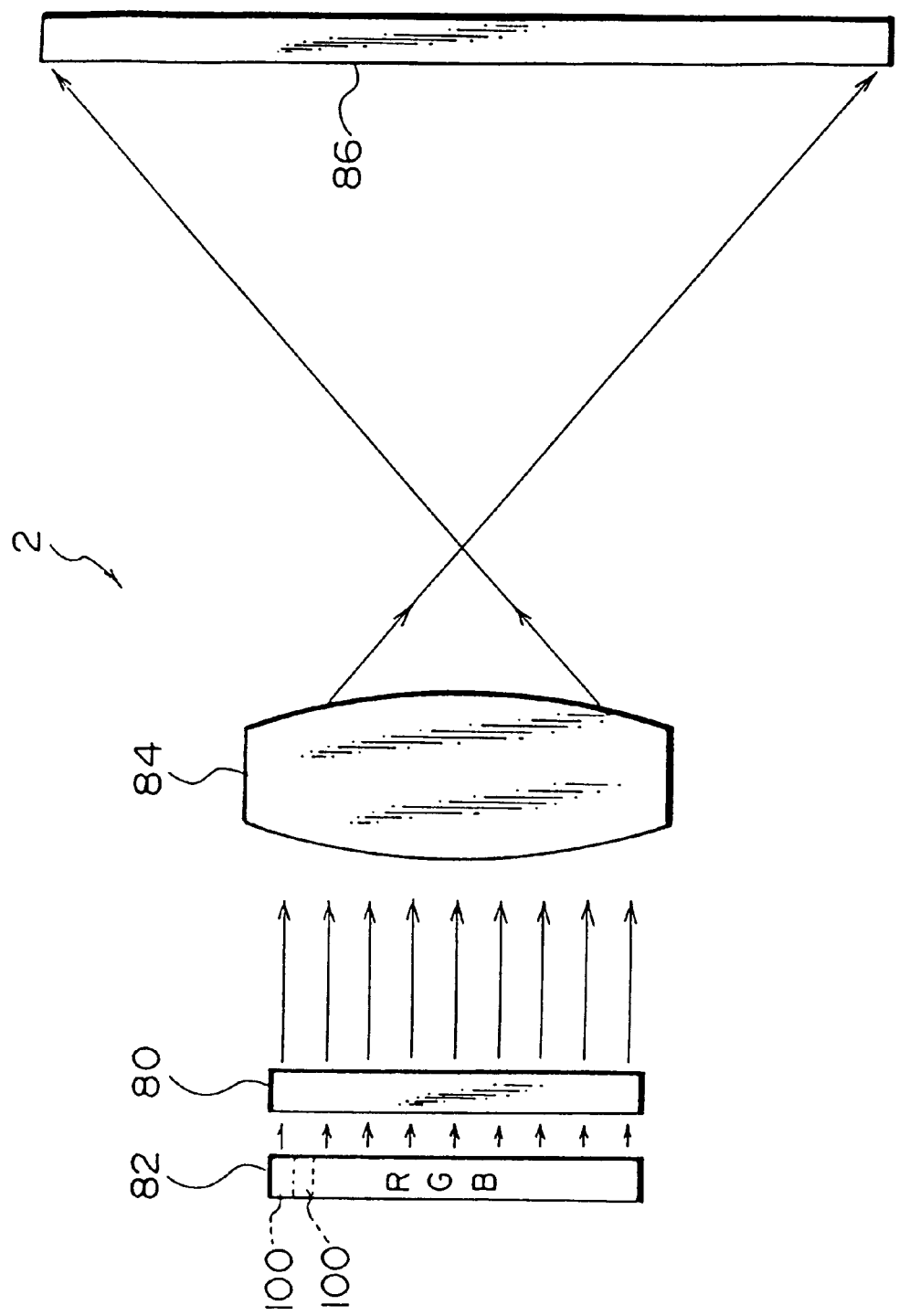
FIG. 4 is a schematic view of a liquid crystal display device in accordance with a second embodiment of the invention.

A schematic view of a liquid crystal display device 2 in accordance with a second embodiment is shown in FIG. 4. This liquid crystal display device 2 is a projection type of display having a pair of liquid crystal panel 80 and light-emitting element array plate 82, a lens 84, and a screen 86. If the liquid crystal display device 2 is viewed from the front surface of the screen 86, it is a front projection display device; if light passes through the screen 86 and is viewed from the rear surface thereof, it is a rear projection display device.

In a similar manner to that of the light-emitting element array plate 20 of FIG. 1, the light-emitting element array plate 82 is configured of a plurality of semiconductor lasers 100. Details such as the arrangement of the light-projecting portions of the semiconductor lasers 100 are basically the same as in the above described first embodiment. Each semiconductor laser 100 is capable of emitting laser beams in the three colors of red (R), green (G), and blue (B). The configuration thereof is described below.

Figure 5A:
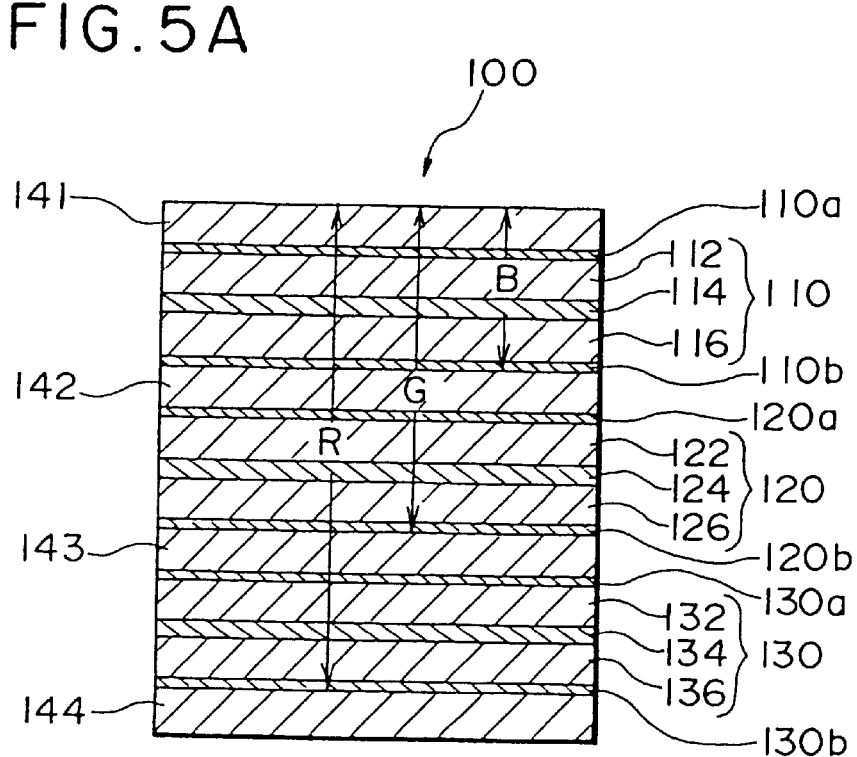
FIG. 5A is a cross-sectional view of a semiconductor laser and FIG. 5B shows the relationship between optical energy and semiconductor energy gap.

A cross-sectional view through the semiconductor laser 100 is shown in FIG. 5A. This semiconductor laser 100 has light-emitting portions 110, 120, and 130.

The light-emitting portion 110 is formed of a cladding layer 112 of a p-type semiconductor, an active layer 114, and a cladding layer 116 of an n-type semiconductor. The active layer 114 is formed of a material that generates a laser beam of a blue (B) wavelength.

The light-emitting portion 120 is formed of a cladding layer 122 of a p-type semiconductor, an active layer 124, and a cladding layer 126 of an n-type semiconductor. The active layer 124 is formed of a material that generates a laser beam of a green (G) wavelength.

The light-emitting portion 130 is formed of a cladding layer 132 of a p-type semiconductor, an active layer 134, and a cladding layer 136 of an n-type semiconductor. The active layer 134 is formed of a material that generates a laser beam of a red (R) wavelength.

A voltage is applied to the light-emitting portion 110 through electrodes 110a and 110b, a voltage is applied to the light-emitting portion 120 through electrodes 120a and 120b, and a voltage is applied to the light-emitting portion 130 through electrodes 130a and 130b.

The arrangement is such that the light-emitting portion 110 is placed between reflective mirrors 141 and 142, the light-emitting portion 120 is placed between reflective mirrors 142 and 143 and the light-emitting portion 130 is placed between reflective mirrors 143 and 144.

In this case, the reflectivity of the first reflective mirror 141 is arranged to be only slightly less than 100% for all of the red (R), green (G), and blue (B) light. Therefore at least part of the reflective mirror 141 acts as a light-projecting portion for laser light. This light-projecting portion is positioned within a region corresponding to a pixel electrode, in the same way as in the embodiment shown in FIG. 1.

The second reflective mirror 142 is designed to reflect light of the blue (B) wavelength. Therefore, light of the blue (B) wavelength that has been emitted by the light-emitting portion 110 oscillates between the reflective mirrors 141 and 142, and is thus amplified by stimulated emission, as shown in FIG. 5A.

Note, however, that the reflective mirror 142 is designed to pass light of the green (G) and red (R) wavelengths.

The reflective mirror 143 reflects light of the green (G) wavelength. Therefore, light of the green (G) wavelength that has been emitted by the light-emitting portion 120 oscillates between the reflective mirrors 141 and 143, and is thus amplified by stimulated emission. The reflective mirror 143 is designed to pass light of the red (R) wavelength.

The reflective mirror 144 is designed to reflect at least light of the red (R) wavelength. Therefore, light of the red (R) wavelength that has been emitted by the light-emitting portion 130 oscillates between the reflective mirrors 141 and 144, and is thus amplified by stimulated emission.

In the above described manner, the light-emitting portions 110, 120, and 130 of this semiconductor laser 100 can emit laser beams of the wavelengths of three colors: blue (B), green (G), and red (R).

Figure 5B:
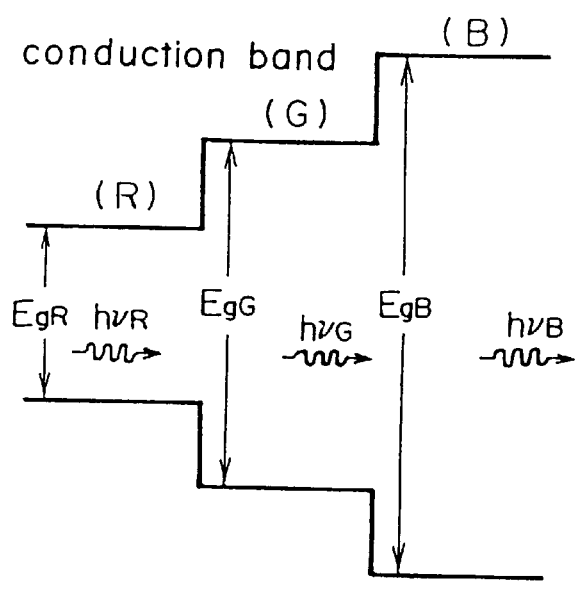

This semiconductor laser 100 is particularly characterized in having a multi-layer structure, in sequence from the light-projecting portion, of the blue (B) light-emitting portion 110, the green (G) light-emitting portion 120, and the red (R) light-emitting portion 130. The reason for this will now be described with reference to FIG. 5B. This figure shows the relationship between optical energy and semiconductor energy gap.

The relationships between the wavelength $\lambda B$ of blue (B) light, the wavelength $\lambda G$ of green (G) light, and the wavelength $\lambda R$ of red (R) light are as follows:

$$\lambda B < \lambda G < \lambda R.$$

It is known that the optical energy of light decreases as the wavelength increases. Therefore, the relationships between the energy $h\nu B$ of blue (B) light, the energy $h\nu G$ of green (G) light, and the energy $h\nu R$ of red (R) light are as follows:

$$h\nu R < h\nu G < h\nu B$$

It is known that the energy gap of a semiconductor that emits light of a short wavelength is large and the energy gap of a semiconductor that emits light of a long wavelength is small. Therefore, the relationships between the semiconductor energy gap EgR of the red (R) light-emitting portion 130, the semiconductor energy gap EgG of the green (G) light-emitting portion 120, and the semiconductor energy gap EgB of the blue (B) light-emitting portion 110 are as follows:

$$EgR < EgG < EgB$$

It is also known that, if the optical energy is greater than the energy gap of the semiconductor, a phenomenon in which the light is absorbed by the semiconductor occurs. It is therefore preferable to have the one of the three light-emitting portions 110, 120, and 130 that has the largest energy gap disposed at the top. This ensures that light of a lower energy passes through semiconductor layers with larger energy gaps, so that it is not absorbed thereby.

In this case, the light-emitting portions 110, 120, and 130 of this embodiment are disposed in a sequence of the largest energy gap at the top. In other words, the light-emitting portions 110, 120, and 130 are disposed in a sequence of the largest emission energy gap at the top.

This arrangement ensures that the emitted light is not absorbed, increasing the efficiency with which the light is utilized.

The above described disposition makes it possible for laser beams of three primary colors (red (R), green (G), and blue (B)) to be emitted from one light-projecting portion. It is also possible for each of the pixels of the liquid crystal panel to display any one of the three primary colors.

The method used for mixing these three primary colors to produce other colors will now be described. In the display device of this embodiment, mixed light is displayed by utilizing the after-image effect of the human eye, in answer to time ratio of light of three primary colors.

Figure 6:
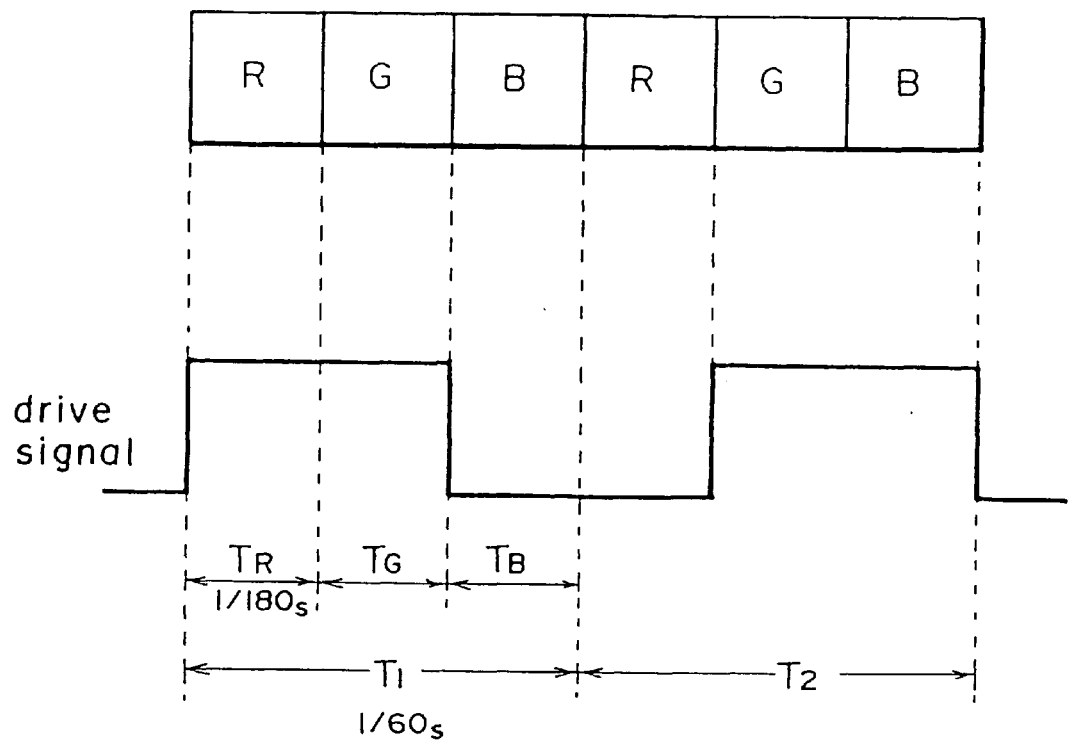
FIG. 6 illustrates the method of driving the liquid crystal panel of the second embodiment.

The method used for driving the liquid crystal panel of this second embodiment is shown in FIG. 6. In this figure, a first frame T1 is divided into an R subframe TR, a G subframe TG, and a B subframe TB, and the liquid crystal panel is driven in each of these subframes. The operation is the same for a second frame T2 onwards.

Laser light of the red (R), green (G), and blue (B) wavelengths is emitted during each period corresponding to the R subframe TR, G subframe TG, and B subframe TB. One frame lasts for approximately 1/60 second and each subframe lasts for approximately 1/180 second. Note that this liquid crystal panel is driven in normally-black mode.

The laser beams are thus emitted in the sequence: red (R), green (G), then blue (B). If the liquid crystal panel is driven in accordance with the subframes of the corresponding colors, combinations of laser beams of colors that have passed through the liquid crystal panel can be used to display mixed colors.

For example, in the first frame T1 shown in FIG. 6, a drive signal is on only during the subframes TR and TG, so that red (R) and green (G) laser beams pass through the liquid crystal panel. This laser light is then displayed on the screen 86 (see FIG. 4). The red (R) and the green (G) are mixed to be yellow (Y) to human eyes, utilizing the after-image effect.

Alternatively, in the second frame T2, green (G) and blue (B) laser light is mixed to give the appearance of cyan (C) light.

Thus laser beams of two different wavelengths that pass through the panel within one frame can be used to display a mixed color. Similarly, mixing laser beams of three different wavelengths creates a transparent color.

With this embodiment, a single pixel of a liquid crystal panel acts as a color pixel. This embodiment thus makes it possible to display with a resolution that is three times greater than that of a prior-art liquid crystal display device in which three dots act as a single color pixel.

What is claimed is:

1. A liquid crystal display device comprising:
    a two-dimensional light-emitting element array plate formed of a plurality of light-emitting elements, said light-emitting elements being arranged in a plane array, each of said light-emitting elements having a light-projecting portion; and
    a liquid crystal panel having a plurality of pixels, each of said pixels corresponding to one of said light-emitting elements, each of said light-emitting elements corresponding to one of said pixels, said light-projecting portion of each of said light-emitting elements being disposed within a light-transmitting region of each of said pixels;
    wherein each of said light-emitting elements is a semiconductor light-emitting element comprising at least three layers of a first, second and third light-emitting portions and four layers of a first, second, third and fourth reflective mirrors disposed in a depthwise direction, said first, second, and third light-emitting portions emitting light of first, second, and third different wavelengths respectively that satisfy a relationship:

first wavelength<second wavelength<third wavelength, said first reflective mirror, said first light-emitting portion, said second reflective mirror, said second light-emitting portion, said third reflective mirror, said third light-emitting portion, and the fourth reflective mirror forming a multi-layer structure in that sequence, said first reflective mirror having a less reflectivity than said fourth reflective mirror to form said light-projecting portion, said second reflective mirror reflecting said light of said first wavelength, said second reflective mirror passing said light of said second and third wavelengths, said third reflective mirror reflecting said light of said second wavelength, said third reflective mirror passing said light of said third wavelength, and said fourth reflective mirror reflecting said light of said third wavelength.

2. The liquid crystal display of claim 1, wherein said light of said first, second and third wavelengths is emitted in a sequence at a predetermined period, said liquid crystal panel is driven in synchronization with said period, and a plurality of colors can be displayed by utilizing an after-image effect of human eyes in response to time ratio of light of each wavelength passing through said liquid crystal panel during a unit time.

3. The liquid crystal display of claim 2, wherein each of said light-emitting elements is a surface-emitting type of semiconductor laser, said semiconductor laser having a pair of cladding layers and an active layer, said cladding layers sandwiching said active layer, at least one of said cladding layers having a columnar shape, said columnar shape having a cross-sectional surface, said cross-sectional surface being short in one direction.

4. The liquid crystal display of claim 3, further comprising a lens and a screen to compose a projection type of display device.

5. The liquid crystal display of claim 4, wherein an image is projected onto a front surface of said screen to compose a front projection display.

6. The liquid crystal display of claim 4, wherein an image is projected onto a rear surface of said screen to compose a rear projection display.

7. The liquid crystal display of claim 1, wherein each of said light-emitting elements is a surface-emitting type of semiconductor laser, said semiconductor laser having a pair of cladding layers and an active layer, said cladding layers sandwiching said active layer, at least one of said cladding layers having a columnar shape, said columnar shape having a cross-sectional surface, said cross-sectional surface being short in one direction.

8. The liquid crystal display of claim 7, further comprising a lens and a screen to compose a projection type of display device.

9. The liquid crystal display of claim 1, further comprising a lens and a screen to compose a projection type of display device.

10. The liquid crystal display of claim 9, wherein an image is projected onto a front surface of said screen to compose a front projection display.

11. The liquid crystal display of claim 9, wherein an image is projected onto a rear surface of said screen to compose a rear projection display.

12. A liquid crystal display device comprising:

a two-dimensional light-emitting element array plate formed of a plurality of light-emitting elements, said light-emitting elements being arranged in a plane array, each of said light-emitting elements having a light-projecting portion; and a liquid crystal panel having a plurality of pixels, each of said pixels corresponding to one of said light-emitting elements, each of said light-emitting elements corresponding to one of said pixels, said light-projecting portion of each of said light-emitting elements being disposed within a light-transmitting region of each of said pixels;

wherein each of said light-emitting elements is a surface-emitting type of semiconductor laser, said semiconductor laser having an active layer and a pair of cladding layers, said cladding layers sandwiching said active layer, at least one of said cladding layers having a columnar shape, said columnar shape having a cross-sectional surface, said cross-sectional surface being short in one direction.

13. The liquid crystal display of claim 12, further comprising a lens and a screen to compose a projection type of display device.

* * * * *